United States Patent
Grosch et al.

(10) Patent No.: US 11,326,486 B2
(45) Date of Patent: May 10, 2022

(54) METHODS AND SYSTEMS FOR A HYBRID ELECTRIC VEHICLE

(71) Applicant: Ford Global Technologies, LLC, Dearborn, MI (US)

(72) Inventors: Guenter Hans Grosch, Vettweiss (DE); Rainer Lach, Wuerselen (DE); Franz Weber, Waldorf (DE); Anselm Hopf, Grevenbroich (DE)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

(21) Appl. No.: 17/023,950

(22) Filed: Sep. 17, 2020

(65) Prior Publication Data

US 2021/0087956 A1   Mar. 25, 2021

(30) Foreign Application Priority Data

Sep. 20, 2019 (DE) .......................... 102019214371.7

(51) Int. Cl.
| | |
|---|---|
| *F01M 5/00* | (2006.01) |
| *B60W 30/18* | (2012.01) |
| *B60L 50/61* | (2019.01) |
| *B60W 10/08* | (2006.01) |
| *B60W 10/06* | (2006.01) |

(52) U.S. Cl.
CPC ............. *F01M 5/005* (2013.01); *B60L 50/61* (2019.02); *B60W 30/18127* (2013.01); *B60W 10/06* (2013.01); *B60W 10/08* (2013.01)

(58) Field of Classification Search
CPC ..... Y02T 10/70; Y02T 10/62; Y02T 10/7072; B60L 7/10; B60L 1/02; B60L 2240/36; B60L 50/61; B60L 58/12; B60L 58/16; B60L 7/22; B60K 7/0007; B60Y 2200/92; Y02E 60/10; F01M 5/001; F01M 5/00; F01M 5/005; F01M 5/02; F01M 11/03; F01M 11/10; B60W 10/06; B60W 10/08; B60W 2510/0676; B60W 2710/305; B60W 30/18127
See application file for complete search history.

(56) References Cited

U.S. PATENT DOCUMENTS

| | | | | |
|---|---|---|---|---|
| 2,195,705 | A | * | 4/1940 | Morgan .................... H05B 3/46 338/257 |
| 3,970,816 | A | * | 7/1976 | Hosokawa ............. F01M 5/021 219/205 |
| 9,162,666 | B2 | | 10/2015 | Holmes |
| 10,036,288 | B2 | | 7/2018 | Leone et al. |

(Continued)

FOREIGN PATENT DOCUMENTS

| | | | | |
|---|---|---|---|---|
| DE | 102007044165 | A1 * | 9/2008 | ........... F02M 31/125 |
| FR | 2978384 | A1 | 2/2013 | |

(Continued)

*Primary Examiner* — George C Jin
*Assistant Examiner* — Teuta B Holbrook
(74) *Attorney, Agent, or Firm* — Geoffrey Brumbaugh; McCoy Russell LLP

(57) ABSTRACT

Methods and systems are provided for an oil heater of a hybrid electric vehicle. The oil heater comprises a metal foam comprising a plurality of pores. The oil heater is activated during a regenerative braking event where an oil temperature is less than a predefined temperature.

20 Claims, 6 Drawing Sheets

(56) References Cited

U.S. PATENT DOCUMENTS

| | | | |
|---|---|---|---|
| 2011/0125351 A1* | 5/2011 | Bauerle | B60L 50/53 |
| | | | 701/22 |
| 2012/0222647 A1 | 9/2012 | Futonagane et al. | |
| 2013/0042825 A1 | 2/2013 | Shimasaki et al. | |
| 2015/0025721 A1 | 1/2015 | Thompson et al. | |
| 2016/0332520 A1* | 11/2016 | Miller | B60L 50/16 |
| 2017/0074130 A1* | 3/2017 | Leone | B60L 3/0046 |
| 2019/0136726 A1* | 5/2019 | Slesinski | F16H 57/0409 |

FOREIGN PATENT DOCUMENTS

| | | | |
|---|---|---|---|
| GB | 805715 A | | 12/1958 |
| GB | 2508262 A | | 5/2014 |
| JP | 63016114 A | * | 1/1988 |
| JP | 4737643 B2 | | 8/2011 |
| JP | 2016217258 A | | 12/2016 |

* cited by examiner

METHODS AND SYSTEMS FOR A HYBRID ELECTRIC VEHICLE

CROSS REFERENCE TO RELATED APPLICATIONS

The present application claims priority to German Patent Application No. 102019214371.7 filed on Sep. 20, 2019. The entire contents of the above-listed application is hereby incorporated by reference for all purposes.

FIELD

The present description relates generally to a hybrid electric vehicle having at least one internal combustion machine, at least one electromotive regenerative braking system, and at least one electrically operable oil heating device, wherein the internal combustion machine has at least one lubricating oil system, which is provided with at least one oil pan, at least one oil filter, and at least one oil line connecting the oil filter to the oil pan.

BACKGROUND/SUMMARY

During a regenerative mode of a hybrid electric vehicle, a relatively large quantity of electric energy may be generated in a relatively short time via an electromotive regenerative braking system of the hybrid electric vehicle, which is available for supplying electrical devices, for example, for charging a secondary battery, of the hybrid electric vehicle. However, conventional secondary batteries cannot store appropriately large quantities of electric energy in the short time, so that at least a part of the electric energy generated in the short time is supposed to be used immediately in another way to improve the energy efficiency of the hybrid electric vehicle.

Hybrid electric vehicles may be operated for a long time in a solely electric driving mode, in which the hybrid electric vehicle is exclusively driven using an electric drive. In such an electric driving mode, however, there is the issue that an internal combustion engine of an internal combustion machine of the hybrid electric vehicle may be heated and/or kept at an optimum temperature to be able to operate the internal combustion engine in an optimal temperature range. Installing an oil heating device for this purpose is known, wherein conventionally a heat transfer device for a lubricating oil of the internal combustion machine may comprise issues with maintaining the lubricating oil temperature below an upper threshold temperature.

JP 47 37 643 B2 discloses an engine fastening device for rapidly increasing a temperature of an engine oil during a cold start of an engine. The device has an installation mount on an outside of a cylinder block, through which a coolant water jacket guided by the cylinder block can be guided to transfer heat from the heated coolant water via foamed metal of the installation mount to the engine oil.

JP 2016 217 258 A discloses an oil supply device, which conducts a lubricating oil taken from an oil pan through an oil filter and then to a main gallery. A net for filtering solids out of the lubricating oil and a heater, which can heat the lubricating oil in the vicinity of the net, are arranged in the oil supply device in a high-pressure oil channel between the oil filter and the main gallery. If it is established during a cold start that moisture contained in the lubricating oil has frozen, the heater is supplied with energy to heat trapped ice blocks and cause them to melt rapidly.

U.S. Pat. No. 9,162,666 B2 discloses a hybrid vehicle, having a vehicle axle and wheels which are installed on the axle in order to rotate with the axle, and a hybrid drive train, which has an engine, a motor-generator, and an energy storage device, which is functionally connected to the motor-generator, wherein the hybrid drive train is functionally connected to the vehicle axle and is configured so as to supply torque to the vehicle axle in order to drive the vehicle. Moreover, the hybrid vehicle has friction brake mechanisms, which are functionally connected to the vehicle wheels to slow the rotation of the wheels, and an exhaust gas system in fluid communication with exhaust gas which flows out of the engine. The exhaust gas system has a waste heat reclamation device, which has an inlet and an outlet, a heat transfer passage, and a bypass passage, through which exhaust gas flows selectively between the inlet and the outlet, and a movable bypass valve, which controls an exhaust gas flow through the waste heat reclamation device, wherein the bypass valve has a first position which permits an exhaust gas flow through the bypass passage and essentially blocks an exhaust gas flow through the heat transfer passage. The bypass valve moreover has a relatively restricted position, which essentially blocks an exhaust gas flow through the bypass passage, which causes exhaust gas to be compressed in the exhaust gas system and torque to be elevated at the engine. Furthermore, the hybrid vehicle has a controller having a processor which executes a stored algorithm which determines a desired vehicle braking power, determines a charging capacity limit of the energy storage device, controls the motor-generator so that it functions as a generator in order to convert torque at the vehicle wheels into electric energy, which is stored in the energy storage device, by regenerative braking if the desired vehicle braking power is not zero and the charge level of the energy storage device is less than a predetermined charge level, and moves the bypass valve into the relatively restricted position if the desired vehicle braking power is greater than the charging capacity limit.

U.S. Pat. No. 10,036,288 B2 discloses a vehicle having an electric machine, which is configured to charge a battery by regenerative braking, an electrical heater, which is configured to heat a drive train lubricating oil, and a controller, which is programmed to conduct regenerative braking power to the electric heater as a reaction to a temperature of the drive train lubricating oil being less than a threshold.

US 2015/0025721 A1 discloses a hybrid drive train system having an internal combustion engine, an electric machine, a battery set, and at least one controller, which is programmed so that, as a reaction to the internal combustion engine being switched on and a temperature linked to the internal combustion engine being less than a predefined threshold value, it causes the power emission by the internal combustion engine to be increased, so that the temperature increases up to a temperature threshold value if the performance demand by the driver is greater than zero and a charge level of the battery set is below one hundred percent.

FR 2,978,384 B1 discloses a method which includes recharging an electric battery with electric energy which is reclaimed by an electric drive machine during braking of an electric automobile if the maximum charge level of the battery is reached, which is between 95 and 100 percent of the theoretical total charge. The electric energy reclaimed by the drive machine is transferred to an electric generator if the battery has reached the maximum charge level, so that the generator operates in the motor mode and drives a thermal engine without starting the engine in order to preheat and lubricate a motor.

The publication "Development of Effective Exhaust Gas Heat Recovery System for a Hybrid Electric Vehicle" (Lee, J., Ohn, H., Choi, J., Kim, S. et al., "Development of Effective Exhaust Gas Heat Recovery System for a Hybrid Electric Vehicle," SAE Technical Paper 2011-01-1171, 2011) discloses heating of a lubricating oil of an internal combustion machine using heat contained in exhaust gases of the internal combustion machine.

The disclosure is based on the desire of improving heating of a lubricating oil of a lubricating oil system of an internal combustion machine and increasing the energy efficiency of a correspondingly equipped hybrid electric vehicle in this way.

In one example, the issues described above may be addressed by a hybrid electric vehicle, comprises at least one internal combustion machine, at least one electromotive regenerative braking system, and at least one electrically operable oil heating device, wherein the internal combustion machine has at least one lubricating oil system, which is provided with at least one oil pan, at least one oil filter, and at least one oil line connecting the oil filter to the oil pan; wherein the oil heating device forms a section of the oil line and is electrically connected to the regenerative braking system. In this way, excess electricity generated during a regenerative braking event may be utilized.

As one example, the oil heater comprises a metal foam with an open cell shape. The metal foam comprises a plurality of pores through which oil may flow. By shaping the metal foam in this way, the oil may be heated more homogenously, which may reduce hot spots and uneven heating.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
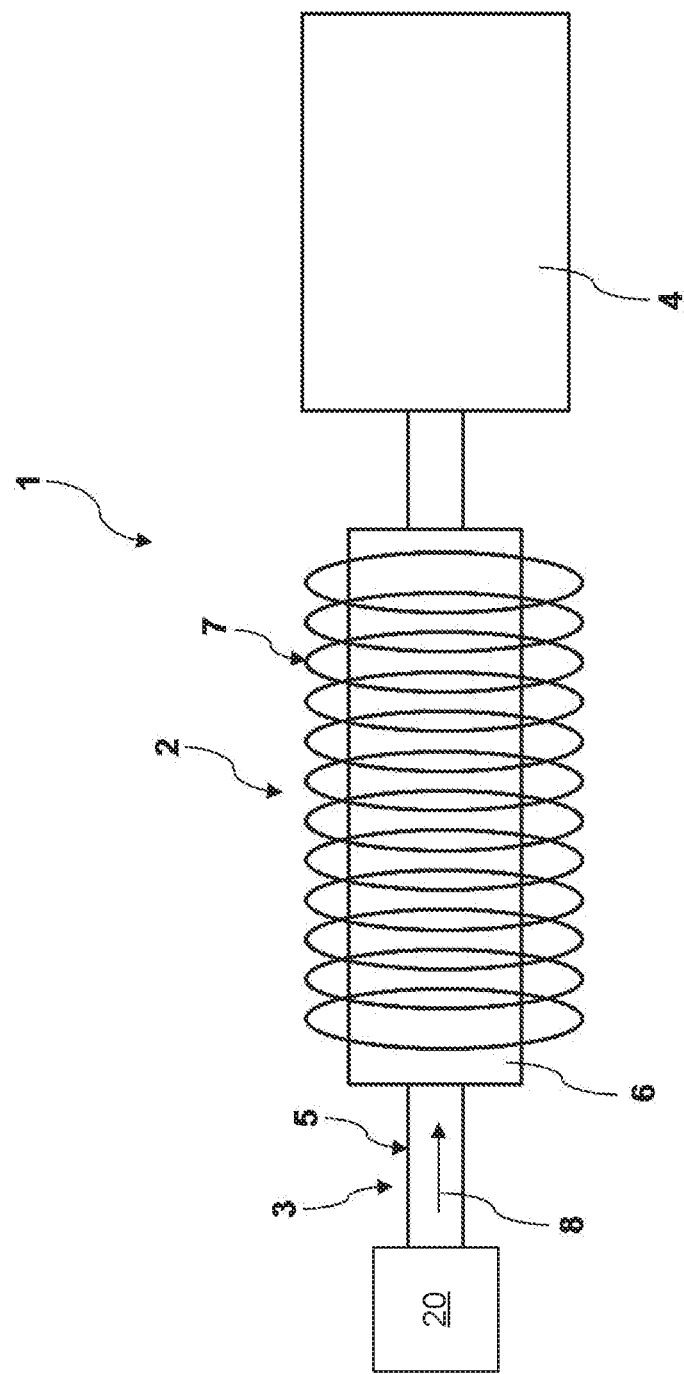
FIG. 1 shows a schematic illustration of an exemplary embodiment of a hybrid electric vehicle according to the disclosure.
Figure 2:
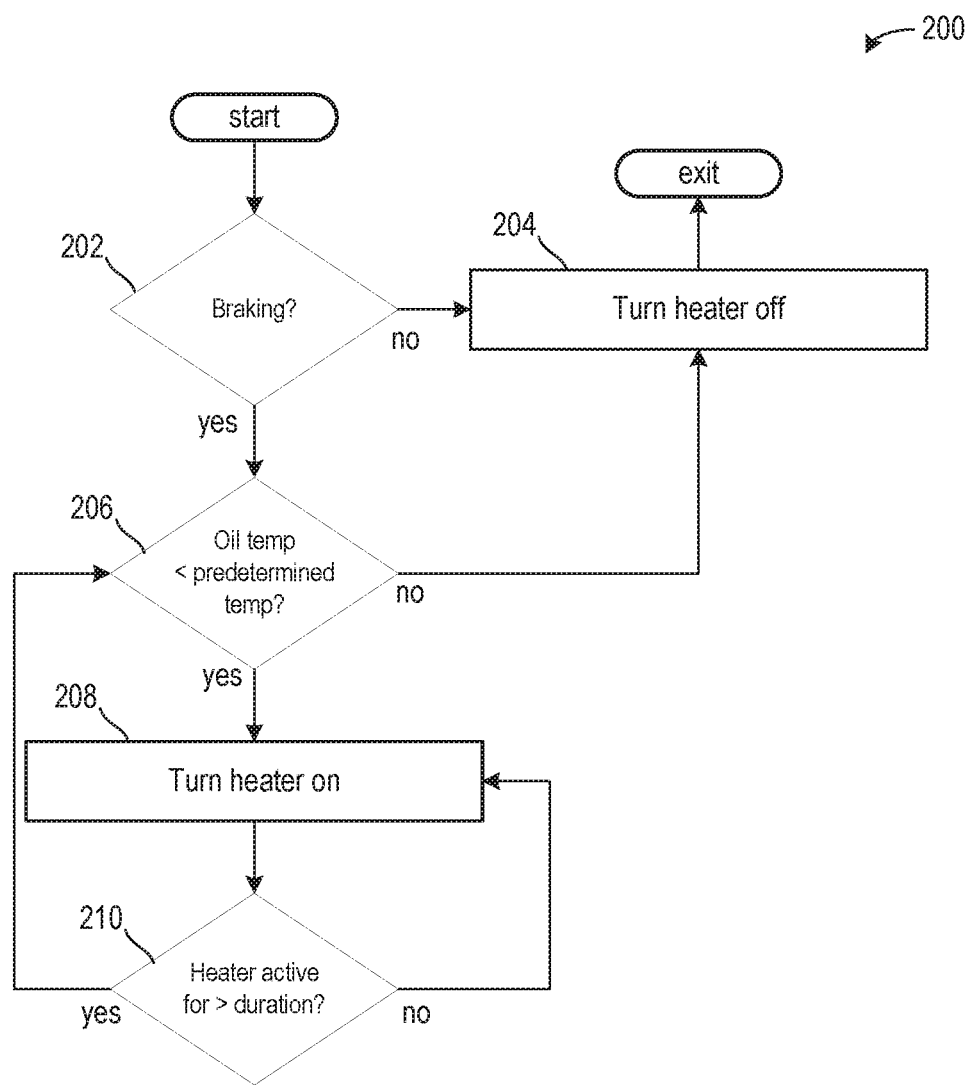
FIG. 2 shows a flow chart of an operation which can be carried out using the hybrid electric vehicle from FIG. 1.
Figure 3:
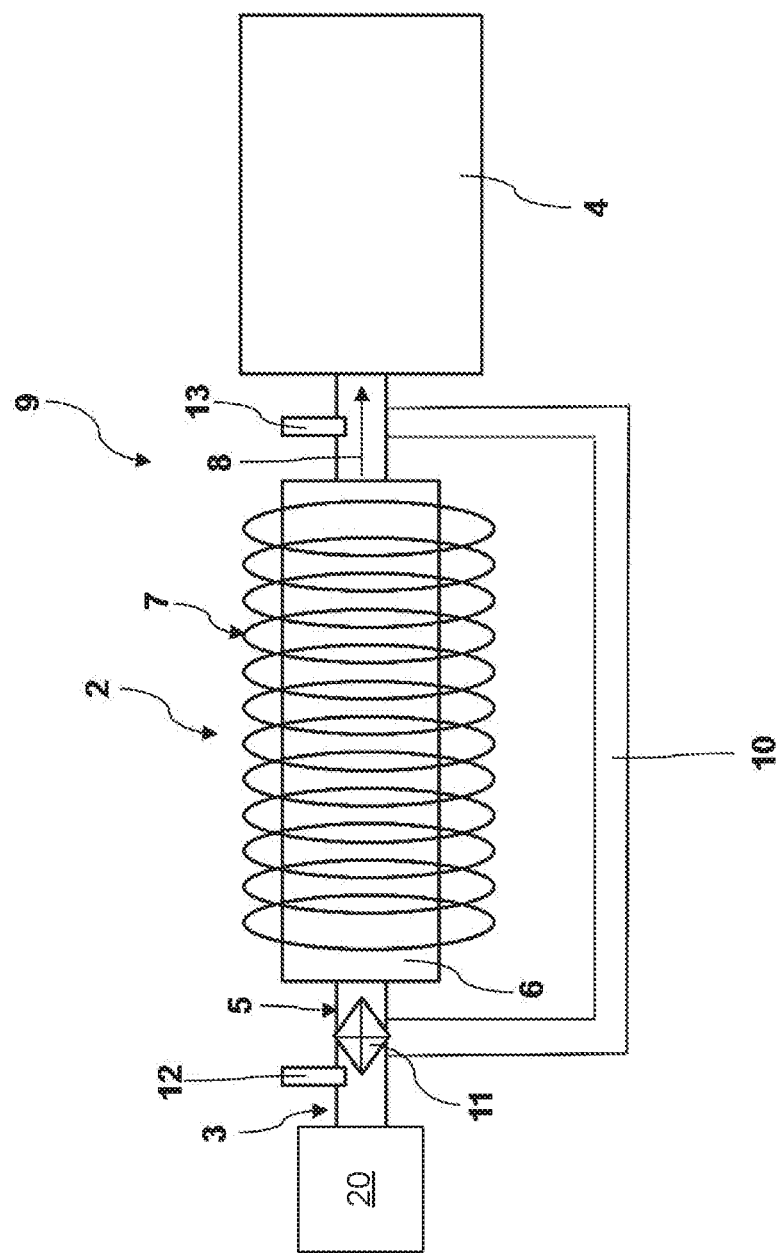
FIG. 3 shows a schematic illustration of a further exemplary embodiment of a hybrid electric vehicle according to the disclosure.
Figure 4:
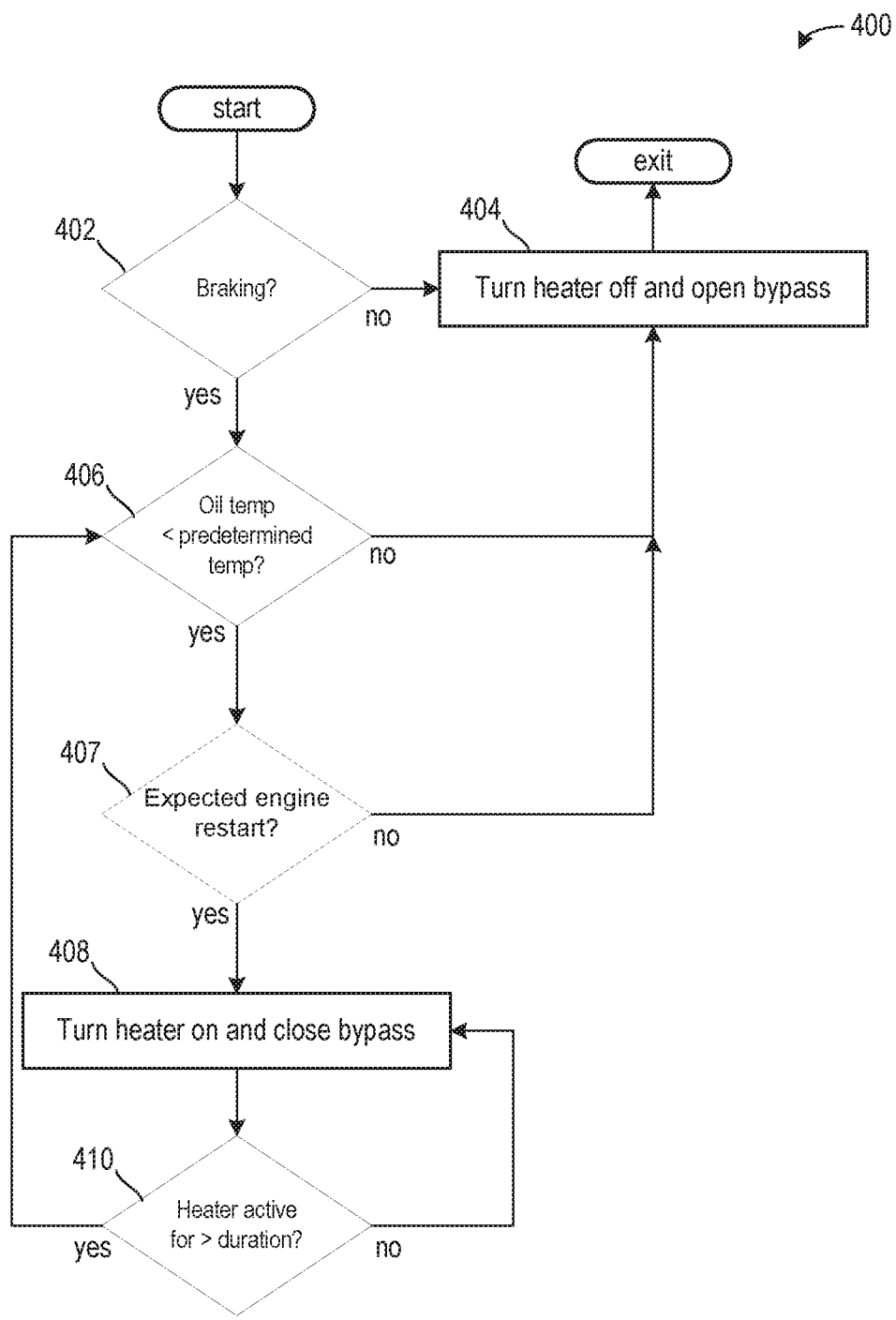
FIG. 4 shows a flow chart of an operation which can be carried out using the hybrid electric vehicle from FIG. 3.
Figure 5:
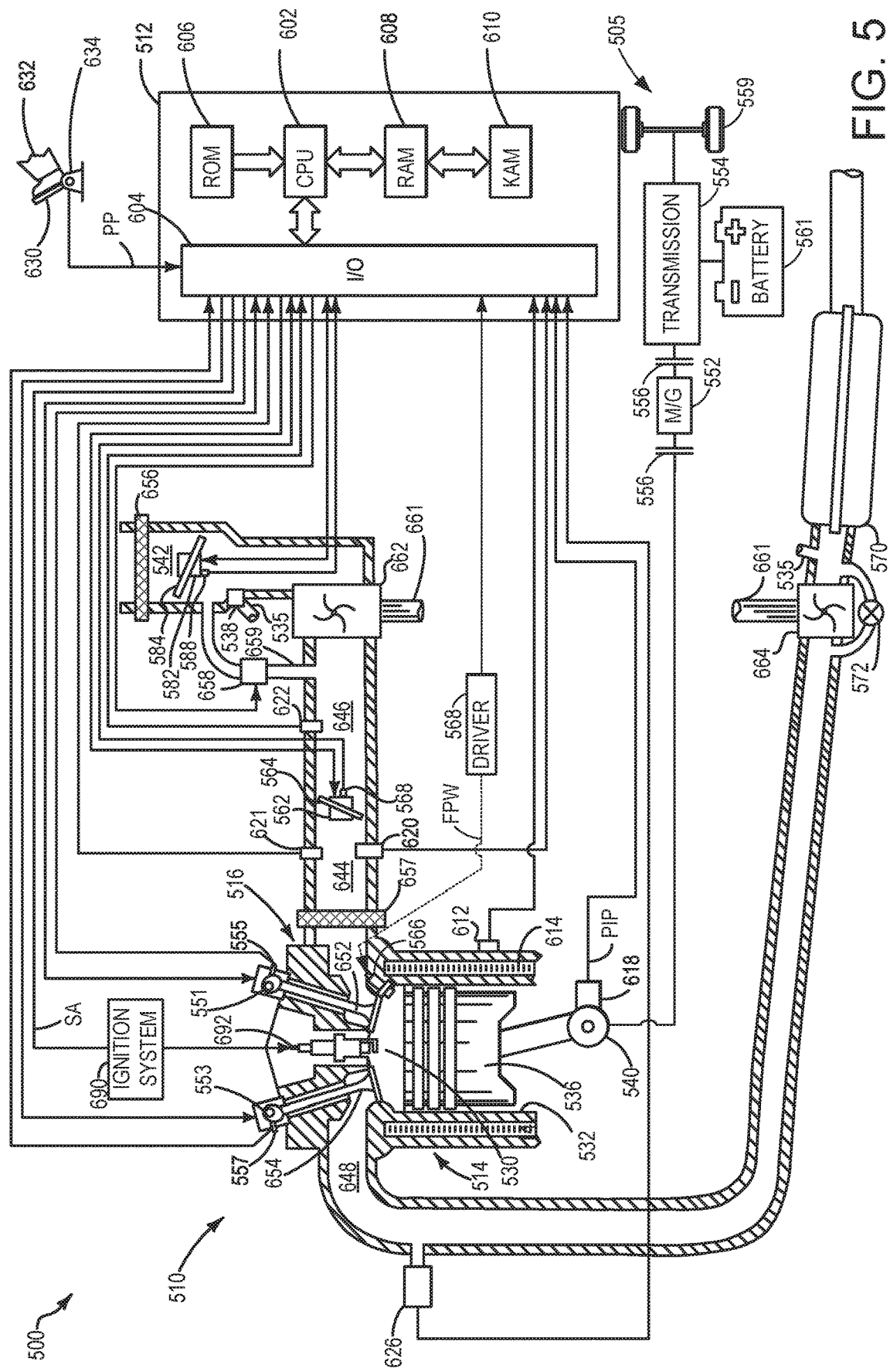
FIG. 5 shows an embodiment of an engine of a hybrid vehicle.
Figure 6:
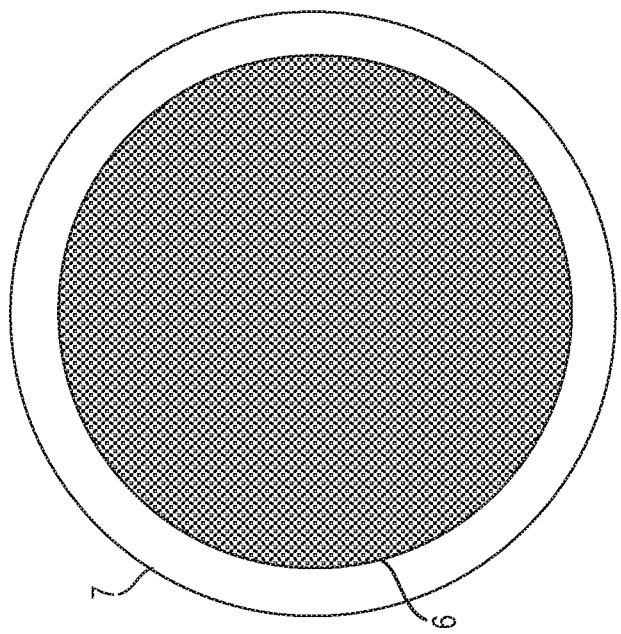
FIG. 6 shows an example of a metal foam.

The following description relates to systems and methods for an oil heating device of which forms a section of the oil line and which is electrically connected to the regenerative braking system. FIG. 1 shows a schematic illustration of an exemplary embodiment of a hybrid electric vehicle according to the disclosure. FIG. 2 shows a flow chart of an operation which can be carried out using the hybrid electric vehicle from FIG. 1. FIG. 3 shows a schematic illustration of a further exemplary embodiment of a hybrid electric vehicle according to the disclosure. FIG. 4 shows a flow chart of an operation which can be carried out using the hybrid electric vehicle from FIG. 3. FIG. 5 shows an embodiment of an engine of a hybrid vehicle. FIG. 6 shows an example of a metal foam.

It is to be noted that the features and measures listed individually in the following description can be combined with one another in any desired technically reasonable manner and disclose further designs of the disclosure. The description additionally characterizes and specifies the disclosure in particular in conjunction with the figures.

According to the disclosure, the electrical oil heating device is connected upstream of the oil filter with respect to a mass flow of the lubricating oil through the oil line, so that the lubricating oil is supplied to the oil filter having a higher temperature and thus a lower viscosity, whereby the lubricating oil can be guided at lower pressure through the oil filter, which is accompanied by a lower energy consumption of the oil pump.

To heat the lubricating oil, the oil heating device is supplied during a regeneration mode of the hybrid electric vehicle according to the disclosure with electric energy which has been generated by the electromotive regenerative braking system. In this way, a relatively large quantity of available electric energy can be consumed in a relatively short time by the oil heating device and thus used reasonably to provide rapid heating of the lubricating oil.

The oil heating device can have a chamber, through which the lubricating oil is guided and which forms the section of the oil line. The chamber can have, for example, a larger cross-sectional area than the oil line. At least one unit that can be supplied with electric energy, which can be configured, for example, as a resistance heating element or for generating an alternating electromagnetic field, can be arranged in the chamber and/or externally on the chamber. The oil heating device can be electrically connected directly or indirectly to the regenerative braking system.

The electromotive regenerative braking system can have at least one electric machine, which can be used in a driving mode as an electric drive and in a braking mode as a generator and which generates electric energy in the braking mode to reclaim energy.

The internal combustion machine has at least one internal combustion engine, for example a gasoline engine or a diesel engine. Moreover, the internal combustion ma-chine has at least one exhaust gas system. The lubricating oil system is used for lubricating moving components of the internal combustion engine. The lubricating oil can be an engine oil in particular.

The hybrid electric vehicle according to the disclosure can be configured, for example, as a plug-in hybrid electric vehicle. The hybrid electric vehicle can be, for example, a passenger vehicle or a utility vehicle.

In some examples, the oil heating device has at least one heating element made of an open-pored metal foam. The heating element can be arranged, for example, in an above-mentioned chamber of the oil heating device to be able to have the lubricating oil to be heated flow around it and/or through it. Due to the formation of the heating element from the open-pored metal foam, the heating element has a relatively large contact area which can be brought into contact with the lubricating oil, whereby better heat transfer can be ensured and the lubricating oil can be heated more uniformly than in the previous examples. In this way, the heating element does not have to be heated as strongly as a conventional heating element, which is not produced from a metal foam. In the event of excessively strong heating, the oil can boil or even partially coke, i.e., solid particles would form on the heating element, which is to be prevented. Moreover, the contact time of a contact of the lubricating oil with the heating element can be kept relatively short without inadequate heating of the lubricating oil being a concern. Since the oil heating device or the heating element is upstream of the oil filter, fragments which possibly detach from the heating element in the course of time can be reliably collected using the oil filter to prevent a harmful effect of such fragments on the internal combustion machine. The lubricating oil flowing through a chamber of the oil heating device equipped with the heating element is preferably additionally mixed inside the chamber in such a way that the temperature of the lubricating oil does not exceed a maximum temperature, whereby boiling of the lubricating oil can be blocked.

According to some examples, the oil heating device has at least one induction coil. The induction coil can be arranged, for example, externally on an above-mentioned chamber of the oil heating device and can be used to generate an alternating electromagnetic field inside the chamber in order to induce electric currents in a heating element arranged in the chamber, in particular made of a metal foam, which heat the heating element. The heating element is heated homogeneously by this induction heating, which is accompanied by more uniform heating of the lubricating oil.

According to some examples, the hybrid electric vehicle has, on the one hand, at least one upstream temperature sensor arranged upstream of the oil heating device on the oil line with respect to an oil mass flow through the oil line and/or at least one downstream temperature sensor arranged downstream of the oil heating device on the oil line and, on the other hand, at least one electronic unit connected to the temperature sensors or the temperature sensor and configured to electrically activate the oil heating device in consideration of measurement signals of the temperature sensors or the temperature sensor in such a way that the oil heating device is exclusively switched on for a predetermined period if a temperature signal of the upstream temperature sensor and/or the downstream temperature sensor falls below a predetermined temperature limiting value. The electronic unit is configured in this case so as to compare the respective generated temperature signal to the predetermined temperature limiting value. The electronic unit can additionally be configured to carry out the described comparison exclusively when the electronic unit detects the presence of a braking mode of the electromotive regenerative braking system. It is thus ensured that exclusively electric energy obtained by regeneration is used for heating the lubricating oil. Since the oil heating device is always only switched on for the predetermined period, for example for 20 seconds, the lubricating oil is reliably prevented from being heated excessively strongly, since it is checked again immediately after the passage of the predetermined period whether the oil heating device is to be switched on or not. The electronic unit can be implemented by corresponding programming of an already provided vehicle electronic unit or as a separate unit thereto.

Another example provides that the hybrid electric vehicle has at least one bypass line, which branches off from the oil line upstream of the oil heating device via a bypass valve and opens into the oil line downstream of the oil heating device, wherein the electronic unit is configured to electrically activate the bypass valve in consideration of measurement signals of the temperature sensors or the temperature sensor in such a way that the bypass valve is exclusively switched from a bypass state releasing the bypass line for a predetermined period into a closed state closing the bypass line if a temperature signal of the upstream temperature sensor and/or the downstream temperature sensor falls below the predetermined temperature limiting value. In this way, the flow resistance for the lubricating oil is reduced during a warm-up mode of the internal combustion machine, since the lubricating oil does not have to flow through and/or around the heating element of the oil heating device, but rather is guided partially or completely through the released bypass line until the temperature of the lubricating oil falls below the predetermined temperature limiting value. Since the bypass line is always only closed for the predetermined period, the lubricating oil is reliably prevented from being heated excessively strongly by the oil heating device, since it is checked again immediately after the passage of the predetermined period whether or not the bypass line is to be closed or whether or not the lubricating oil is to be guided through the oil heating device. The bypass valve can be designed as a 3/2-way valve. The predetermined period during which the bypass valve is switched into the closed state can correspond to the predetermined period during which the oil heating device is switched on.

In some examples, the electronic unit is configured to electrically activate the bypass valve in consideration of measurement signals of the temperature sensors or the temperature sensor in such a way that the predetermined period during which the bypass valve is switched into the closed state is longer than the predetermined period during which the oil heating device is switched on. Running on of the lubricating oil through the oil heating device can be implemented in this way, so that the lubricating oil does not remain in the still hot heating element and coke. An end time of the predetermined period during which the bypass valve is switched into the closed state can be defined after passage of the predetermined period during which the oil heating device is switched on by direct or indirect monitoring of the temperature of the heating element, wherein the predetermined period during which the bypass valve is switched into the closed state can be ended when the temperature of the heating element has fallen below a predetermined temperature. This can be carried out, for example, by a temperature comparison by means of the electronic unit, for ex-ample in that a temperature probe is arranged on the heating element and is electrically connected to the electronic unit or the electronic unit determines the end time of the predetermined period during which the bypass valve is switched into the closed state on the basis of a temperature difference between the temperature of the lubricating oil, determined, for example, using the upstream temperature sensor, before the heating element or the oil heating device and the temperature of the lubricating oil, determined, for example, using the downstream temperature sensor, after the heating element or the oil heating device. The predetermined period during which the bypass valve is switched into the closed state preferably begins simultaneously with the predetermined period during which the oil heating device is switched on.

In another example, the hybrid electric vehicle has at least one secondary battery, wherein the electronic unit is configured to monitor a state of the secondary battery and to switch on the oil heating device in dependence on the state of the secondary battery. For example, the state, in particular the aging state ("state of health"; SOH) or charge state ("state of charge"; SOC), of the secondary battery, in particular drive battery, can indicate that the secondary battery cannot absorb the electric energy presently resulting due to regeneration, because it either cannot be charged as fast, for example due to its aging state, or its charge state does not permit it. There can thus be operating states in which it is better to charge the secondary battery using the electric energy obtained by regeneration and operating states in which it is better to supply the oil heating device with the electric energy.

Turning now to FIG. 1, it shows a schematic illustration of an exemplary embodiment of a hybrid electric vehicle 1 according to the disclosure having an internal combustion machine, a non-limiting example of which is illustrated in FIG. 5, an electromotive regenerative braking system, and an electrically operable oil heating device 2, which is electrically connected to the regenerative braking system.

The internal combustion machine has a lubricating oil system 3, which may be provided with an oil pan 20, an oil filter 4, and an oil line 5 connecting the oil filter 4 to the oil pan 20. The oil heating device 2 forms a section of the oil line 5. For this purpose, the oil heating device 2 has a chamber 6 forming the section of the oil line 5, a heating element comprises an open-pored metal foam and arranged inside the chamber 6, and an induction coil 7 enclosing the chamber 6 radially on the outside. An example of the metal foam of the chamber 6 is illustrated in FIG. 6.

Moreover, the hybrid electric vehicle 1 can have at least one upstream temperature sensor arranged on the oil line 5 upstream of the oil heating device 2 with respect to an oil mass flow through the oil line 5 indicated by an arrow 8 and/or at least one downstream temperature sensor arranged downstream of the oil heating device 2 on the oil line 5.

Furthermore, the hybrid electric vehicle 1 can have an electronic unit, which is connected to the temperature sensors or the temperature sensor and is configured to electrically activate the oil heating device 2 in consideration of measurement signals of the temperature sensors or the temperature sensor in such a way that the oil heating device 2 is exclusively switched on for a predetermined period if a temperature signal of the upstream temperature sensor and/or the downstream temperature sensor falls below a predetermined temperature limiting value, for example 80° C.

The electronic unit can be configured to compare the respective generated temperature signal to the predetermined temperature limiting value. The electronic unit can additionally be configured to exclusively carry out the described comparison if the electronic unit detects the presence of a braking mode of the electromotive regenerative braking system.

The electronic unit can moreover be configured to monitor a state of the secondary battery and to switch on the oil heating device in dependence on the state of the secondary battery.

The functionality of the hybrid electric vehicle 1 from FIG. 1 is described hereinafter with reference to FIG. 2.

FIG. 2 shows a flow chart 200 of an operation which can be carried out using the hybrid electric vehicle from FIG. 1. In step 202, the electronic unit checks whether or not a braking mode of the electromotive regenerative braking system is present. If such a braking mode is not present, then the method 200 proceeds to 204 and the oil heating device remains in its switched-off state OFF. In contrast, if such a braking mode is present, the electronic unit checks in a next step 206 whether or not the temperature of the lubricating oil is less than a predetermined temperature limiting value. In one example, the predetermined temperature limiting value is 80° C. If the temperature of the lubricating oil is not less than the predetermined temperature limiting value, the oil heating device remains in its switched-off state OFF at 204. In contrast, if the temperature of the lubricating oil is less than the predetermined temperature limiting value, the electronic unit switches the oil heating device into a switched-on state ON as the method 200 proceeds to 208. The method 200 proceeds to 210 to determine whether or not a predetermined period has passed. In one example, the predetermined period is equal to a duration of time (e.g., 20 seconds). If the predetermined period has not passed, the electronic unit keeps the oil heating device in the switched-on state ON. In contrast, if the predetermined period has passed, the electronic unit goes to step 206. During the switched-on state, the oil heating device may warm up oil in the oil line.

FIG. 3 shows a schematic illustration of a further exemplary embodiment of a hybrid electric vehicle 9 according to the disclosure. The hybrid electric vehicle 9 differs from the exemplary embodiment shown in FIG. 1 in that it additionally has a bypass line 10, which branches off from the oil line 5 upstream of the oil heating device 2 wherein oil flow through the bypass line 10 and the oil line 5 is controlled by a bypass valve 11 and opens into the oil line 5 downstream of the oil heating device 2, wherein the electronic unit is configured to electrically activate the bypass valve 11 in consideration of measurement signals of the temperature sensors 12 and 13 in such a way that the bypass valve 11 is exclusively switched from a bypass state releasing the bypass line 10 for a predetermined period into a closed state closing the bypass line 10 if a temperature signal of the upstream temperature sensor 12 and/or the downstream temperature sensor 13 falls below the predetermined temperature limiting value.

The electronic unit can be configured to electrically activate the bypass valve 11 in consideration of measurement signals of the temperature sensors 12 and 13 or the temperature sensor 12 or 13 in such a way that the predetermined period during which the bypass valve 11 is switched into the closed state is longer than the predetermined period during which the oil heating device 2 is switched on.

FIG. 4 shows a flow chart 400 of an operation which can be carried out using the hybrid electric vehicle from FIG. 3. In step 402, the electronic unit checks whether or not a braking mode of the electromotive regenerative braking system is present. If such a braking mode is not present, the oil heating device remains in its switched-off state OFF and the bypass valve remains in its bypass state OPEN, which releases the bypass line at 404. In contrast, if such a braking mode is present, the electronic unit checks in a next step 406 whether or not the temperature of the lubricating oil is less than a predetermined temperature limiting value. If the temperature of the lubricating oil is not less than the predetermined temperature limiting value, the oil heating device remains in its switched-off state OFF and the bypass valve remains in its bypass state OPEN at 404. If the temperature of the lubricating oil is less than the predetermined temperature limiting value, in contrast, the electronic unit switches the oil heating device into a switched-on state ON and the bypass valve into its closed state CLOSED, which closes the bypass line at 408. The method 400 proceeds to 410 to determine whether or not the predetermined period has passed. If the predetermined period has not passed, the electronic unit keeps the oil heating device in the switched-on state ON and the bypass valve in its closed state CLOSED, which closes the bypass line. In contrast, if the predetermined period has passed, the electronic unit goes to step 406 to determine if heating is still desired or if sufficient heating has occurred.

In some examples, the method 400 may optionally comprise a step 407, wherein the method 400 determines if an engine restart is expected. The engine restart may be expected if a total drive range of the vehicle in an all-electric mode is less than a remaining distance of a current vehicle trip. If the engine is not expected to be restarted and it is possible to complete a vehicle trip in the all-electric mode, then the method 400 proceeds to 404 and turns off the heater and opens the bypass. Additionally or alternatively, the excess electricity generated during the regenerative braking event may be utilized to power an auxiliary component, such as an air conditioner or similar device. If the engine will be restarted during the vehicle trip, then the method 400 proceeds to 408 as described above.

FIG. 5 depicts an engine system 500 for a vehicle. The vehicle may be an on-road vehicle having drive wheels which contact a road surface. Engine system 500 includes engine 510 which comprises a plurality of cylinders. FIG. 5 describes one such cylinder or combustion chamber in detail.

Engine 510 includes a cylinder block 514 including at least one cylinder bore, and a cylinder head 516 including intake valves 652 and exhaust valves 654. In other examples, the cylinder head 516 may include one or more intake ports and/or exhaust ports in examples where the engine 510 is configured as a two-stroke engine. The cylinder block 514 includes cylinder walls 532 with piston 536 positioned therein and connected to crankshaft 540. Thus, when coupled together, the cylinder head 516 and cylinder block 514 may form one or more combustion chambers. As such, the combustion chamber 530 volume is adjusted based on an oscillation of the piston 536. Combustion chamber 530 may also be referred to herein as cylinder 530. The combustion chamber 530 is shown communicating with intake manifold 644 and exhaust manifold 648 via respective intake valves 652 and exhaust valves 654. Each intake and exhaust valve may be operated by an intake cam 551 and an exhaust cam 553. Alternatively, one or more of the intake and exhaust valves may be operated by an electromechanically controlled valve coil and armature assembly. The position of intake cam 551 may be determined by intake cam sensor 555. The position of exhaust cam 553 may be determined by exhaust cam sensor 557. Thus, when the valves 552 and 554 are closed, the combustion chamber 530 and cylinder bore may be fluidly sealed, such that gases may not enter or leave the combustion chamber 530.

Combustion chamber 530 may be formed by the cylinder walls 532 of cylinder block 514, piston 536, and cylinder head 516. Cylinder block 514 may include the cylinder walls 532, piston 536, crankshaft 540, etc. Cylinder head 516 may include one or more fuel injectors such as fuel injector 566, one or more intake valves 652, and one or more exhaust valves such as exhaust valves 654. The cylinder head 516 may be coupled to the cylinder block 514 via fasteners, such as bolts and/or screws. In particular, when coupled, the cylinder block 514 and cylinder head 516 may be in sealing contact with one another via a gasket, and as such the cylinder block 514 and cylinder head 516 may seal the combustion chamber 530, such that gases may only flow into and/or out of the combustion chamber 530 via intake manifold 644 when intake valves 652 are opened, and/or via exhaust manifold 648 when exhaust valves 654 are opened. In some examples, only one intake valve and one exhaust valve may be included for each combustion chamber 530. However, in other examples, more than one intake valve and/or more than one exhaust valve may be included in each combustion chamber 530 of engine 510.

In some examples, each cylinder of engine 510 may include a spark plug 692 for initiating combustion. Ignition system 690 can provide an ignition spark to cylinder 514 via spark plug 692 in response to spark advance signal SA from controller 512, under select operating modes. However, in some embodiments, spark plug 692 may be omitted, such as where engine 510 may initiate combustion by auto-ignition or by injection of fuel as may be the case with some diesel engines.

Fuel injector 566 may be positioned to inject fuel directly into combustion chamber 530, which is known to those skilled in the art as direct injection. Fuel injector 566 delivers liquid fuel in proportion to the pulse width of signal FPW from controller 512. Fuel is delivered to fuel injector 566 by a fuel system (not shown) including a fuel tank, fuel pump, and fuel rail. Fuel injector 566 is supplied operating current from driver 568 which responds to controller 512. In some examples, the engine 510 may be a gasoline engine, and the fuel tank may include gasoline, which may be injected by injector 566 into the combustion chamber 530. However, in other examples, the engine 510 may be a diesel engine, and the fuel tank may include diesel fuel, which may be injected by injector 566 into the combustion chamber. Further, in such examples where the engine 510 is configured as a diesel engine, the engine 510 may include a glow plug to initiate combustion in the combustion chamber 530.

Intake manifold 644 is shown communicating with throttle 562 which adjusts a position of throttle plate 564 to control airflow to engine cylinder 530. This may include controlling airflow of boosted air from intake boost chamber 646. In some embodiments, throttle 562 may be omitted and airflow to the engine may be controlled via a single air intake system throttle (AIS throttle) 582 coupled to air intake passage 542 and located upstream of the intake boost chamber 646. In yet further examples, AIS throttle 582 may be omitted and airflow to the engine may be controlled with the throttle 562.

In some embodiments, engine 510 is configured to provide exhaust gas recirculation, or EGR. When included, EGR may be provided as high-pressure EGR and/or low-pressure EGR. In examples where the engine 510 includes low-pressure EGR, the low-pressure EGR may be provided via EGR passage 535 and EGR valve 538 to the engine air intake system at a position downstream of air intake system (AIS) throttle 582 and upstream of compressor 662 from a location in the exhaust system downstream of turbine 664. EGR may be drawn from the exhaust system to the intake air system when there is a pressure differential to drive the flow. A pressure differential can be created by partially closing AIS throttle 582. Throttle plate 584 controls pressure at the inlet to compressor 662. The AIS may be electrically controlled and its position may be adjusted based on optional position sensor 588.

Ambient air is drawn into combustion chamber 530 via intake passage 542, which includes air filter 656. Thus, air first enters the intake passage 542 through air filter 656. Compressor 662 then draws air from air intake passage 542 to supply boost chamber 646 with compressed air via a compressor outlet tube (not shown in FIG. 5). In some examples, air intake passage 542 may include an air box (not shown) with a filter. In one example, compressor 662 may be a turbocharger, where power to the compressor 662 is drawn from the flow of exhaust gases through turbine 664. Specifically, exhaust gases may spin turbine 664 which is coupled to compressor 662 via shaft 661. A wastegate 572 allows exhaust gases to bypass turbine 664 so that boost pressure can be controlled under varying operating conditions. Wastegate 572 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 572 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered. As described above, the wastegate 572 and the plurality of vanes in the turbine 664 may be used to adjust boost pressure to conserve boost pressure for a subsequent high-load transient event while avoiding compressor surge. In this way, turbine 664 may be used similarly to turbine 16 of FIG. 1.

Compressor recirculation valve 658 (CRV) may be provided in a compressor recirculation path 659 around compressor 662 so that air may move from the compressor outlet to the compressor inlet so as to reduce a pressure that may develop across compressor 662. A charge air cooler 657 may be positioned in boost chamber 646, downstream of compressor 662, for cooling the boosted aircharge delivered to the engine intake. However, in other examples as shown in FIG. 5, the charge air cooler 657 may be positioned downstream of the electronic throttle 562 in an intake manifold 644. In some examples, the charge air cooler 657 may be an air to air charge air cooler. However, in other examples, the charge air cooler 657 may be a liquid to air cooler.

In the depicted example, compressor recirculation path 659 is configured to recirculate cooled compressed air from upstream of charge air cooler 657 to the compressor inlet. In alternate examples, compressor recirculation path 659 may be configured to recirculate compressed air from downstream of the compressor and downstream of charge air cooler 657 to the compressor inlet. CRV 658 may be opened and closed via an electric signal from controller 512. CRV 658 may be configured as a three-state valve having a default semi-open position from which it can be moved to a fully-open position or a fully-closed position.

Universal Exhaust Gas Oxygen (UEGO) sensor 626 is shown coupled to exhaust manifold 648 upstream of emission control device 570. Alternatively, a two-state exhaust gas oxygen sensor may be substituted for UEGO sensor 626. Emission control device 570 may include multiple catalyst bricks, in one example. In another example, multiple emission control devices, each with multiple bricks, can be used. While the depicted example shows UEGO sensor 626 upstream of turbine 664, it will be appreciated that in alternate embodiments, UEGO sensor may be positioned in the exhaust manifold downstream of turbine 664 and upstream of emission control device 570. Additionally or alternatively, the emission control device 570 may comprise a diesel oxidation catalyst (DOC) and/or a diesel cold-start catalyst, a particulate filter, a three-way catalyst, a $NO_x$ trap, selective catalytic reduction device, and combinations thereof. In some examples, a sensor may be arranged upstream or downstream of the emission control device 570, wherein the sensor may be configured to diagnose a condition of the emission control device 570.

Controller 512 is shown in FIG. 5 as a microcomputer including: microprocessor unit 602, input/output ports 604, read-only memory 606, random access memory 608, keep alive memory 610, and a conventional data bus. Controller 512 is shown receiving various signals from sensors coupled to engine 510, in addition to those signals previously discussed, including: engine coolant temperature (ECT) from temperature sensor 612 coupled to cooling sleeve 614; a position sensor 634 coupled to an input device 630 (e.g., an accelerator pedal) for sensing input device pedal position (PP) adjusted by a vehicle operator 632; a knock sensor for determining ignition of end gases (not shown); a measurement of engine manifold pressure (MAP) from pressure sensor 621 coupled to intake manifold 644; a measurement of boost pressure from pressure sensor 622 coupled to boost chamber 646; an engine position sensor from a Hall effect sensor 618 sensing crankshaft 540 position; a measurement of air mass entering the engine from sensor 620 (e.g., a hot wire air flow meter); and a measurement of throttle position from sensor 568. Barometric pressure may also be sensed (sensor not shown) for processing by controller 512. In a preferred aspect of the present description, Hall effect sensor 618 produces a predetermined number of equally spaced pulses every revolution of the crankshaft from which engine speed (RPM) can be determined. The input device 630 may comprise an accelerator pedal and/or a brake pedal. As such, output from the position sensor 630 may be used to determine the position of the accelerator pedal and/or brake pedal of the input device 630, and therefore determine a desired engine torque. Thus, a desired engine torque as requested by the vehicle operator 632 may be estimated based on the pedal position of the input device 630.

In some examples, vehicle 505 may be a hybrid vehicle with multiple sources of torque available to one or more vehicle wheels 559. In other examples, vehicle 505 is a conventional vehicle with only an engine, or an electric vehicle with only electric machine(s). In the example shown, vehicle 505 includes engine 510 and an electric machine 552. Electric machine 552 may be a motor or a motor/generator. Crankshaft 540 of engine 510 and electric machine 552 are connected via a transmission 554 to vehicle wheels 559 when one or more clutches 56 are engaged. In the depicted example, a first clutch 556 is provided between crankshaft 540 and electric machine 552, and a second clutch 556 is provided between electric machine 552 and transmission 554. Controller 512 may send a signal to an actuator of each clutch 556 to engage or disengage the clutch, so as to connect or disconnect crankshaft 540 from electric machine 552 and the components connected thereto, and/or connect or disconnect electric machine 552 from transmission 554 and the components connected thereto. Transmission 554 may be a gearbox, a planetary gear system, or another type of transmission. The powertrain may be configured in various manners including as a parallel, a series, or a series-parallel hybrid vehicle.

Electric machine 552 receives electrical power from a traction battery 561 to provide torque to vehicle wheels 559. Electric machine 552 may also be operated as a generator to provide electrical power to charge battery 561, for example during a braking operation. That is to say, the electric machine 52 may comprise regenerative braking capabilities, such that a state of charge of the battery 561 may increase during some braking conditions.

The controller 512 receives signals from the various sensors of FIG. 5 and employs the various actuators of FIG. 5 to adjust engine operation based on the received signals and instructions stored on a memory of the controller. For example, adjusting operation of the electric machine 552 may occur based on feedback from ECT sensor 612. Instructions for carrying out methods 200 and 400 may be executed by the controller 512 based on instructions stored on a memory of the controller and in conjunction with signals received from sensors of the engine system, such as the sensors described above, such as the temperature sensors 12 and 13 of FIG. 3. The controller may employ engine actuators of the engine system to adjust engine operation, according to the methods described below.

FIGS. 1, 3, 5, and 6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Thus, in one example, during recuperation a high amount of electric energy may be available during a short time period. This may charge a vehicle battery and allow extended all-electric vehicle operations. As described above, engine temperature maintenance during the all-electric vehicle operations is desired to block oil coking while maintaining a desired engine operating temperature to decrease emissions and enhance performance.

As described above, the oil heater comprises a foam arranged between an oil pan and an oil filter. The form may comprise metal or other conductive material. By arranged in the heater upstream of the oil filter relative to a direction of oil flow, the filter may capture metal shavings or other parts of the heater and/or oil pan, thereby blocking undesired components entering lubrication systems of the engine and the transmission, which may increase a longevity of the vehicle components. Additionally, a viscosity of the oil may be reduced and the oil may travel through the oil filter more easily. The reduced viscosity may further improve an energy consumption of an oil pump.

The metal foam may heat the oil more homogenously relative to previous examples of oil heaters with heating walls or pins. Furthermore, a duration of heating the metal foam may be reduced relative to the heating elements of previous examples. Hot spots may be avoided due to the oil being separated and remixing by flowing through the pores of the metal foam.

Turning now to FIG. 6, it shows an example of the chamber 6 arranged in the induction coil 7. As illustrated, the chamber 6 comprises an open-cell configuration that allows oil flowing through the chamber 6 to separate into distinct portions of the metal foam. In one example, each pore may be distinct passage through the metal foam, wherein oil from the plurality of pores may mix downstream of the chamber 6. Additionally or alternatively, the pores may merge within the chamber 6, such that oil may separate and mix within the chamber 6 before flowing to the filter.

In one example, the metal foam comprises two or more portions, wherein an inner portion may be solid and an outer portion may be porous. Additionally or alternatively, the metal foam may comprise a porous inner portion, a solid middle portion, and a porous outer portion, wherein the outer portion is nearest the induction coil 7 and the inner portion is furthest from the induction coil 7. In some examples, additionally or alternatively, a heating element, such as an extension of the induction coil 7, may extend through a central portion of the metal foam in the chamber 6. As such, the metal foam may comprise a ring shape, wherein the metal foam is concentrically sandwiched by the induction coil.

The technical effect of the oil heater is to enhance oil heating and temperature maintenance of the oil. In one example, the oil heater comprises a metal foam which may more homogenously heat oil flowing therethrough. Furthermore, the oil heater may comprise a bypass passage and a set of temperature sensors, wherein the bypass passage may divert oil away from the oil heater during conditions where a cold-start is occurring or when an oil temperature is above a predetermined temperature. The temperature sensors may include a first sensor adjacent to an inlet and a second sensor adjacent to an outlet of the bypass passage, wherein feedback from either or both of the sensors may guide a position of a bypass valve of the oil heater. For example, if the first or sensor senses an oil temperature above the predetermined temperature, then the bypass valve may be moved to an open position to bypass the oil heater.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A hybrid electric vehicle, comprises:
at least one internal combustion machine, at least one electromotive regenerative braking system, and at least one electrically operable oil heating device, wherein the internal combustion machine has at least one lubricating oil system, which is provided with at least one oil pan, at least one oil filter, and at least one oil line connecting the oil filter to the oil pan; wherein
the oil heating device forms a section of the oil line and is electrically connected to the regenerative braking system.

2. The hybrid electric vehicle of claim 1, wherein the oil heating device comprises at least one heating element comprising an open-pored metal foam.

3. The hybrid electric vehicle of claim 2, wherein the oil heating device comprises at least one induction coil.

4. The hybrid electric vehicle of claim 1, further comprising at least one upstream temperature sensor arranged upstream of the oil heating device on the oil line with respect to an oil mass flow through the oil line and at least one downstream temperature sensor arranged downstream of the oil heating device on the oil line; and
a controller with computer-readable instructions stored on non-transitory memory thereof that when executed enable the controller to receive feedback from the temperature sensors, wherein the instructions further enable the controller to electrically activate the oil heating device based on feedback from the temperature sensors, wherein the oil heating device is switched on for a predetermined period if a temperature signal of the upstream temperature sensor or the downstream temperature sensor falls below a predetermined temperature limiting value.

5. The hybrid vehicle of claim 4, further comprising a bypass line which branches off the oil line at a first junction upstream of the oil heating device and a second junction downstream of the oil heating device, wherein a bypass valve is arranged at the first junction, wherein the instructions further enable the controller to adjust a positon of the bypass valve in response to feedback from the temperature sensors, wherein the bypass valve is adjusted to a closed position if the temperature signal of the upstream temperature sensor or the downstream temperature sensor falls below the predetermined limiting valve.

6. The hybrid vehicle of claim 5, the instructions further enable the controller to adjust the bypass valve to an open position in response to the oil heating device being activated for greater than a predetermined period.

7. The hybrid vehicle of claim 4, further comprising at least one battery, wherein the controller is configured to adjust operation of the oil heating device based on a state of the at least one battery.

8. A system, comprising:
a hybrid vehicle comprising an engine and a battery;
an oil heater arranged along an oil line between an oil pan and an oil filter, wherein the oil heater comprises an open cell metal foam and an induction coil; and
a controller comprising computer-readable instructions stored on non-transitory memory thereof that when executed enable the controller to:
activate the oil heater in response to an oil temperature being less than a predetermined temperature during a regenerative braking event.

9. The system of claim 8, wherein the instructions further enable the controller to deactivate the oil heater in response to the oil heater being active for greater than a predetermined period.

10. The system of claim 8, wherein the oil heater is electrically powered via the battery, and wherein a state of charge of the battery is replenished during the regenerative braking event.

11. The system of claim 8, wherein the battery is a first battery, further comprising a second battery configured to power the oil heater, wherein energy supplied to the second battery to power the oil heater is equal to a difference between electricity produced during the regenerative braking event and electricity supplied to recharge the first battery.

12. The system of claim 8, wherein the oil heater is activated in response to an engine restart being expected during a trip.

13. The system of claim 12, further comprising a bypass passage and a bypass valve, wherein the bypass valve is moved to a closed position when the oil heater is activated.

14. The system of claim 13, wherein the bypass valve is moved to an open position when the oil heater is deactivated.

15. The system of claim 14, wherein the oil heater is deactivated outside of the regenerative braking event and during a cold-start.

16. The system of claim 8, wherein the open cell metal foam comprises a plurality of pores configured to receive oil.

17. A hybrid electric vehicle, comprising:
an engine and a battery;
an oil heater arranged along an oil line between an oil pan and an oil filter, wherein the oil heater comprises an open cell metal foam and an induction coil, further comprising a bypass passage and a bypass valve; and
a controller comprising computer-readable instructions stored on non-transitory memory thereof that when executed enable the controller to:
activate the oil heater in response to an oil temperature being less than a predetermined temperature during a regenerative braking event, and wherein the bypass valve is closed; and deactivate the oil heater in response to the oil heater being active for greater than a predetermined period, and wherein the bypass valve is opened.

18. The hybrid electric vehicle of claim 17, wherein the oil heater is not activated in response to the oil temperature being less than the predetermined temperature during the regenerative braking event if the engine is not expected to restart during a vehicle trip.

19. The hybrid electric vehicle of claim 18, wherein the engine is expected to restart if a remaining distance of the vehicle trip is greater than a distance travelable during an all-electric vehicle driving mode.

20. The hybrid electric vehicle of claim 17, wherein the open cell metal foam is configured to mix oil.

* * * * *